(12) United States Patent
Barresi (10) Patent No.: US 10,344,495 B2
(45) Date of Patent: Jul. 9, 2019

(54) FLOOD DEFENSE SYSTEM

(71) Applicant: Samuel N. Barresi, Saint Augustine, FL (US)

(72) Inventor: Samuel N. Barresi, Saint Augustine, FL (US)

(*) Notice: Subject to any disclaimer, the term of this patent is extended or adjusted under 35 U.S.C. 154(b) by 6 days.

(21) Appl. No.: 15/968,874

(22) Filed: May 2, 2018

(65) Prior Publication Data

US 2019/0017315 A1 Jan. 17, 2019

Related U.S. Application Data

(60) Provisional application No. 62/710,513, filed on Feb. 20, 2018, provisional application No. 62/604,572, filed on Jul. 13, 2017.

(51) Int. Cl.
*E04H 9/14* (2006.01)
*E06B 9/02* (2006.01)
*E06B 9/00* (2006.01)

(52) U.S. Cl.
CPC ............... *E04H 9/145* (2013.01); *E06B 9/02* (2013.01); *E06B 2009/007* (2013.01)

(58) Field of Classification Search
CPC . E02B 7/005; E02B 7/02; E02B 3/106; E06B 9/00; E06B 2009/005; E06B 2009/007; E06B 9/02; E04H 9/145; Y02A 50/14; Y10S 52/12
See application file for complete search history.

(56) References Cited

U.S. PATENT DOCUMENTS

| | | | | |
|---|---|---|---|---|
| 3,861,081 A * | 1/1975 | Maskell | ............... | E06B 9/00 405/104 |
| 5,077,945 A * | 1/1992 | Koeniger | ............... | E06B 9/00 405/114 |
| 5,918,430 A * | 7/1999 | Rowland | ............... | E06B 3/28 244/129.3 |
| 5,943,832 A * | 8/1999 | Russell | ............... | E06B 9/00 49/55 |
| 6,269,597 B1 * | 8/2001 | Haas | ............... | E06B 9/02 49/464 |
| D470,252 S * | 2/2003 | Castrey | ............... | D25/138 |
| 8,869,455 B1 * | 10/2014 | McFall | ............... | E06B 9/02 49/466 |
| 2006/0086057 A1 * | 4/2006 | Rasenberger | ............... | E06B 9/02 52/202 |
| 2006/0201743 A1 * | 9/2006 | Dell'Erba | ............... | E04G 13/00 182/82 |
| 2008/0098679 A1 * | 5/2008 | Chan | ............... | E02B 7/22 52/302.1 |

(Continued)

FOREIGN PATENT DOCUMENTS

| | | | | |
|---|---|---|---|---|
| GB | 2362416 A * | 11/2001 | ............... | E06B 9/00 |
| GB | 2392702 A * | 3/2004 | ............... | E06B 9/00 |

(Continued)

*Primary Examiner* — Adriana Figueroa
*Assistant Examiner* — Jessie T Fonseca
(74) *Attorney, Agent, or Firm* — The Rapacke Law Group, P.A.

(57) ABSTRACT

Embodiments are described for a flood defense system having a barrier portion which is selectively engaged with a frame of an entryway. A seal on the interior barrier portion engages a gasket on the frame to provide a barrier for flood waters entering a structure.

15 Claims, 8 Drawing Sheets

(56) References Cited

U.S. PATENT DOCUMENTS

| | | | | |
|---|---|---|---|---|
| 2014/0109482 A1* | 4/2014 | Rakhmanin | ............... | E06B 9/00 |
| | | | | 49/463 |
| 2014/0308078 A1* | 10/2014 | Mulvihill | ................ | E02B 3/106 |
| | | | | 405/16 |
| 2015/0147120 A1* | 5/2015 | Adler | ...................... | E02B 3/108 |
| | | | | 405/116 |
| 2016/0145861 A1* | 5/2016 | Wexler | ...................... | E06B 9/02 |
| | | | | 52/202 |

FOREIGN PATENT DOCUMENTS

| | | | | | | |
|---|---|---|---|---|---|---|
| GB | | 2423110 A | * | 8/2006 | ............. | E06B 9/01 |
| GB | | 2452042 A | * | 2/2009 | ............. | E06B 9/00 |
| GB | | 2459940 A | * | 11/2009 | ............. | E06B 9/00 |
| WO | WO-2011098152 A1 | * | 8/2011 | ............. | E04H 9/145 |

\* cited by examiner

FLOOD DEFENSE SYSTEM

CROSS REFERENCE TO RELATED APPLICATIONS

This application claims priority to U.S. Provisional Application 62/604,572 filed Jul. 13, 2017 in addition to U.S. Provisional Application 62/710,513 filed Feb. 20, 2018 which are both hereby incorporated by reference.

FIELD

The present invention generally relates to flood defense systems and more specifically relates to barriers configured to hold back flood waters from entering a building.

BACKGROUND

For individuals living near water, especially in an area where large storms are common, flooding becomes an expensive and dangerous risk in day-to-day life. Floodwaters are a major source of property damage. They can come from waters rising during a storm surge, from swollen rivers rising above flood stage due to snow melt or heavy rains, or from waters saturating the ground and overloading the drainage systems during extended periods of heavy rainfall. An ever-present need exists to manage and prevent floodwaters from inundating or infiltrating buildings and other constructions.

Perhaps areas with the most risk are structures near the shorelines of a body of water. Some cities have constructed levies, flood gates, fabricated steel barriers, and concrete walls to help protect the buildings and residents nearby. These city-wide solutions tend to be time consuming to construct, prone to failure as the assembly ages, and far too costly for many to consider. These also block the desired open view of the water nearby and disturb the natural beauty of the landscape.

In the current arts, many designs exist for the mediation of water damage to a structure or environment. U.S. Patent Pub. No. 2012/0034032 to Waters et al. describes a self-actuating flood guard for a construction which holds a buoyant gate at an elevation spaced from the ground. This is positioned between flanking spaced vertical boundary walls adapted for connection to the construction. The gate is pivotable members about a horizontal axis normal to the boundary walls for buoyant rotation upwardly between the boundary walls on rise of water above the elevation.

U.S. Pat. No. 7,435,036 to University Court of Glasgow is directed towards a flexible water gate suitable for retaining water in a port canal or river estuary. While this system may be useful for large scale environment, it is impractical for private home or business use.

U.S. Pat. No. 7,121,764 to Rorheim is directed towards a portable flood barrier section located on a ground to form a barrier against flooding water. The invention has an erectable wall which along one of its edges is hinged to a basis. The hinge enables rotating erection of the wall from an essentially horizontal position to an erect position. A flexible or rigid tie which extends from the basis to the wall on the flooded side of the wall prevents an erection of the wall beyond the erected position. A seal is in the erected position of the flood barrier section located between the flood barrier section and the ground.

While the aforementioned prior art may help with flood mitigation, a more elegant, economical, and universal system is desired in the current art. One such solution is described in the embodiments herein.

SUMMARY OF THE INVENTION

Embodiments described herein provide for a flood barrier system which may be selectively engaged with a structure during periods of high risk flooding. The flood barrier assembly has at least one flood barrier portion having an interior and an exterior side dimensioned to sufficiently seal an entryway. The entryway has a frame and a gasket permitting the sealed engagement of the barrier portion. A brace assembly is affixed to the exterior side and a seal affixed to the interior side.

In an embodiment, the brace assembly has a substantially vertical member and a substantially horizontal member. At least one brace member extends between the vertical member and the horizontal members. The brace assembly is positioned on the exterior side of the barrier portion, providing support to the flood barrier assembly during a flood event.

In an embodiment, the sealed engagement provides positive suction therebetween to prevent the leakage of materials.

In an embodiment, the at least one barrier portion has a plurality of apertures each configured to receive a fastener therethrough. The entryway has a frame and a gasket, the entryway frame having a plurality of receivers each configured to retain a fastener.

In an embodiment, a user may procure at least one barrier portion, a frame, and a plurality of fasteners. The user then positions the barrier portion over the entryway and fastens the barrier portion to the frame.

In an embodiment, the seal and the gasket are similarly dimensioned to provide the sealed engagement therebetween. This sealed engagement provides positive suction therebetween to prevent the leakage of materials.

Preferentially, each fastener is a threaded member configured to threadingly engage the corresponding receiver.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In general, the invention described herein relates to a selectively engaged flood defense system that is configured to form an effective barrier against floodwaters. The apparatus 100 is configured to sealingly engage with a potential entryway 102. The entryway may be defined as a doorway, hallway, window, or other point of physical entry (whether via a person or other matter) to where flood waters may enter through.

In reference to FIGS. 1-7, the apparatus is illustrated in an embodiment of the present design. A flood barrier portion 104 constructed of a sufficiently rigid material is provided. A double-faced steel panel with polyurethane core is the preferred material to be utilized with the present invention. The material may be high-density polyethylene ("HDPE") or a similar suitable material resistant to forces generated by the water, as well as oxidation and other detrimental effects inherent in regions where flooding is common. The barrier portion 104 is dimensioned to sealingly engage with the entryway 102. Each barrier portion 104 is comprised of an exterior side 106 and interior side 108. A plurality of apertures 110 are positioned along a perimeter substantially near each edge (113, 114, 115, 116) of the barrier portion 104.

Figures 1, 2:
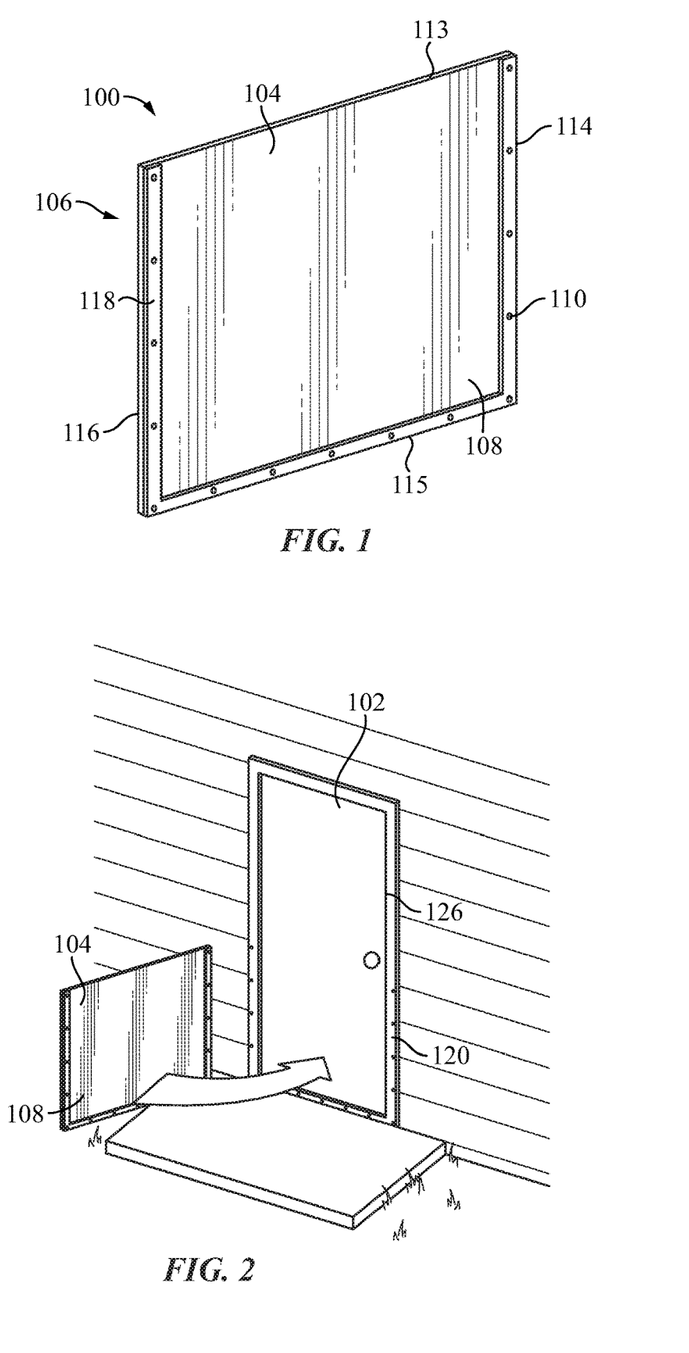
FIG. 1 illustrates a perspective view of the barrier system, according to an embodiment of the present invention.
FIG. 2 illustrates a perspective view of the barrier and structure, according to an embodiment of the present invention.
Figure 3:
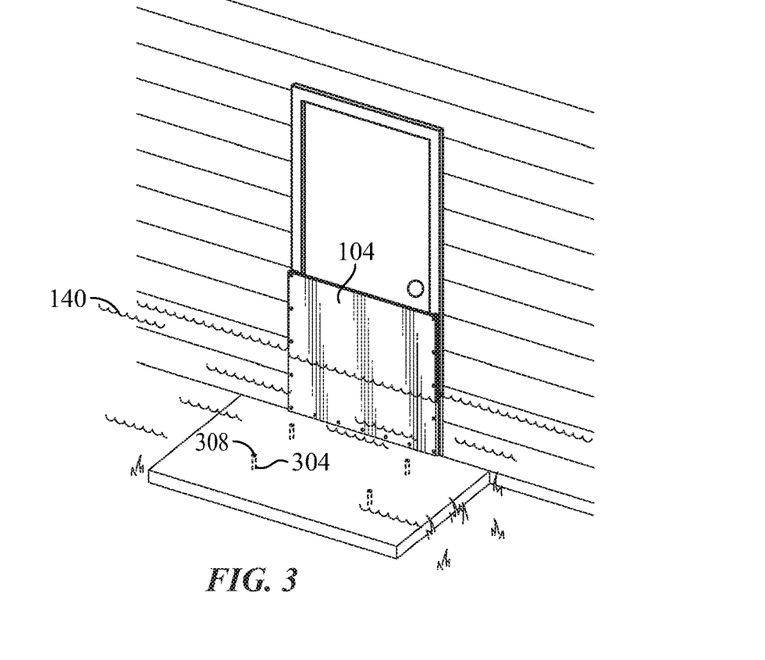
FIG. 3 illustrates a perspective view of the barrier engaged with the structure, according to an embodiment of the present invention.
Figure 5:
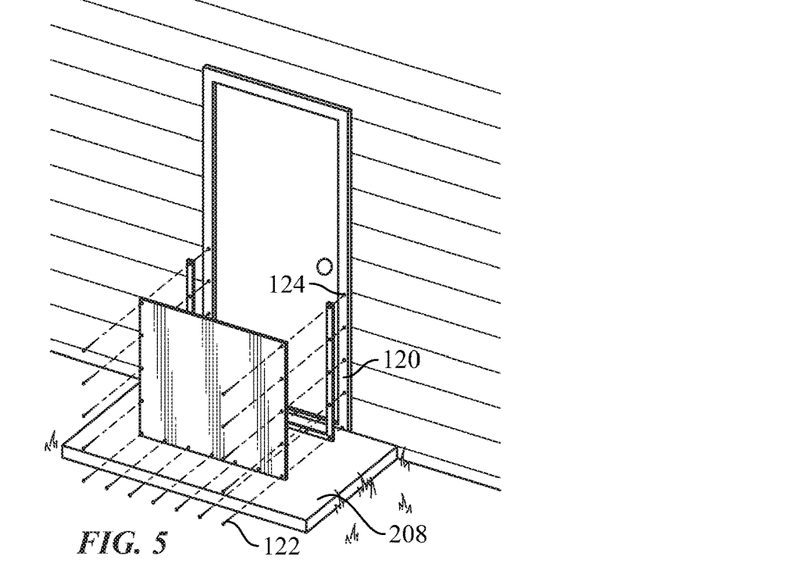
FIG. 5 illustrates a perspective view of the barrier and structure, according to an embodiment of the present invention.

In specific reference to FIG. 2 and FIG. 5, a seal 118 is positioned central in relation to the apertures to provide a sealed engagement with an entryway gasket 120. To effectively seal the entryway, the seal 118 and entryway gasket 120 are similarly dimensioned to sufficiently contact one another. Each of the seal and gasket may be constructed of a rubber, or another suitable material commonly used in the arts.

Figure 4:
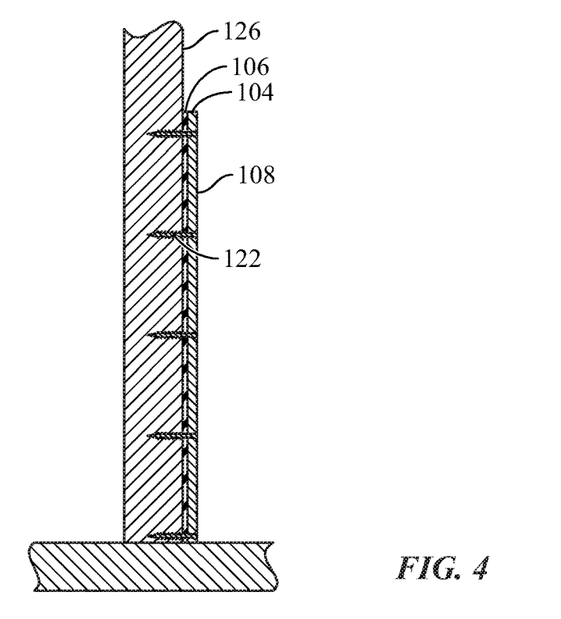
FIG. 4 illustrates a cut away view of the barrier engaged with the structure via machine screws, according to an embodiment of the present invention.

Each aperture 110 receives a fastener 122 therethrough as shown in FIG. 4. The fasteners 122 engage with receivers 124 positioned along a surface of the entryway frame 126. In a preferred embodiment, each fastener 122 is a threaded member configured to threadingly engage a corresponding receiver having threads therein. Once each fastener 122 is engaged with the corresponding receiver 124 the pressure provided therefrom is sufficient to provide a sealed engagement between the seal 118 and entryway gasket 120. In an embodiment, the sealed engagement results in a positive sealing pressure exceeding pressure caused by floodwater and other intrusive objects, effectively sealing the door.

In an embodiment, each machine screw 124 threadingly engages a tapped insert 122. Once machine screw is removed, a cap screw is engaged with the tapped insert 122 to protect from corrosion and foreign materials entering the receiver.

Figure 6:
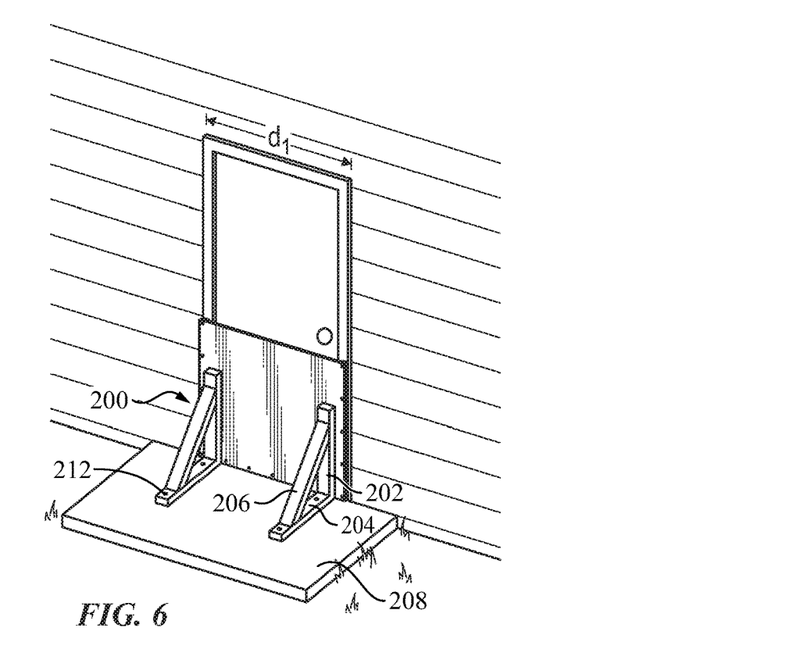
FIG. 6 illustrates a perspective view of the barrier engaged with the structure, according to an embodiment of the present invention.
Figure 7:
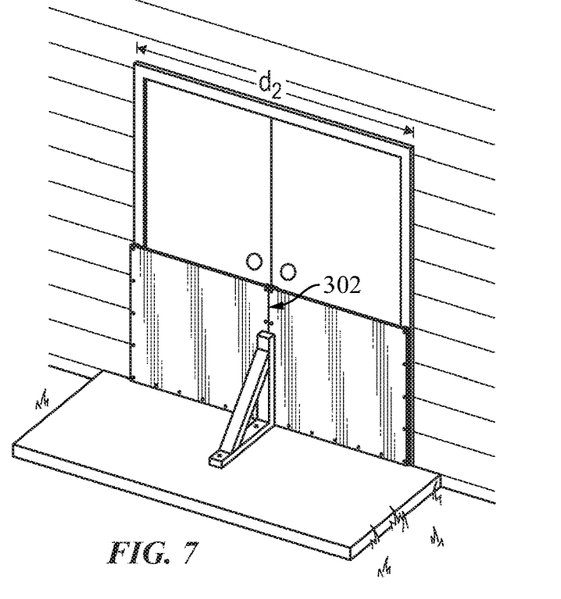
FIG. 7 illustrates a perspective view of multiple barriers engaged with the structure, according to an embodiment of the present invention.

In a preferred embodiment and as illustrated in FIG. 6, a brace assembly 200 is engaged with the exterior side of the barrier 104 comprised of a substantially vertical member 202 and substantially horizontal member 204. The vertical member 202 is affixed to the exterior side 106 while the horizontal member 204 contacts the ground or other support. At least one brace 206 extends between each member to provide support to the apparatus 100 during stressful flood conditions. To provide adequate support, the brace assembly 200 is constructed of sufficiently rigid material such as a metal, metal alloy, or high-density plastic such as HDPE.

In a preferred embodiment, the brace assembly 200 is fastened to a concrete slab exterior to the structure using masonry inserts 212. Once the brace assembly is removed, the masonry insert receivers 304 receivers are protected from corrosion and foreign materials with a cap screw 308.

In use, when water is present on the exterior side 106 of the assembly 100, leakage through the entryway is prevented by the effective engagement of the barrier portion and the entryway as described above. Before a flood event, a user may procure a barrier portion, entryway frame, and fasteners. The user positions the barrier portion with the exterior side to the oriented to the exterior of a structure. The frame is affixed to the entryway, or the entryway may be provided with the frame permanently affixed thereto. Apertures are aligned with the receivers and fasteners are positioned therethrough to threadingly engage the harder and frame.

The user may then ensure a sealed engagement between the gasket and seal has been made. After flooding has ceased or the threat thereof has ended, the barrier may be removed by unthreading the fasteners from the receivers and removing the barrier from the entryway.

In an alternate embodiment, the user may procure the brace assembly and affix the brace assembly to the exterior side of the barrier portion. The brace assembly is configured to provide additional support to the assembly 100 to ensure that the strong forces resulting from flood waters do not compromise the structure of the assembly, structure, or entryway.

In an alternate embodiment, the top edge 113 of the barrier portion may not have a rubber seal, leaving the bottom 115 and side edges 114, 116 having the rubber seal. The top edge 113 may not have a plurality of apertures disposed thereon. As a result, the user only fastens the bottom 115 and side edges 114, 116.

In an instance where the entryway 102 is too large for a single barrier portion 104, any number of barrier portions may be affixed to one another at an edge (113, 114, 115, 116) utilizing secondary fasteners. In this manner, the user may construct a barrier of any size for a multitude of entryway 102 sizes and configurations.

Figure 8:
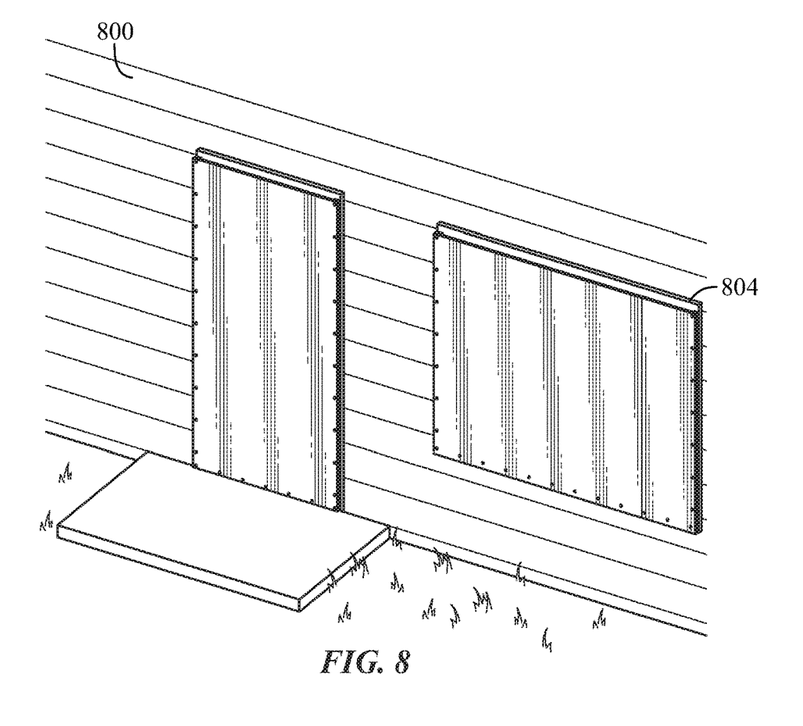
FIG. 8 illustrates a perspective view of the structure having the barrier system engaged with a door and a window, according to an embodiment of the present invention.
Figure 9:
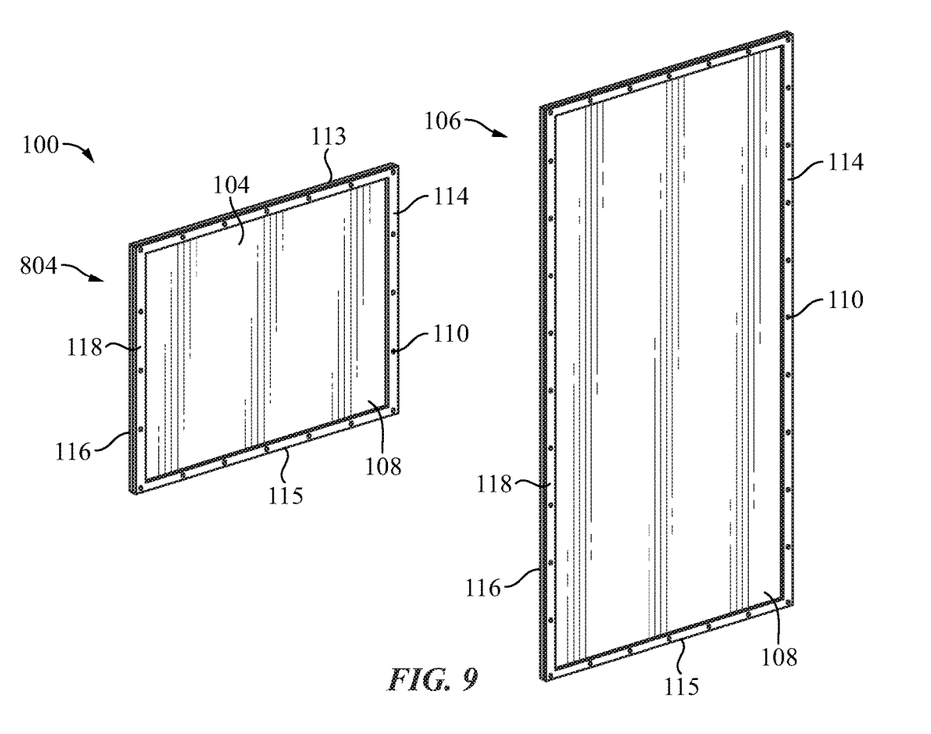
FIG. 9 illustrates a perspective view of the barrier system, according to an embodiment of the present invention.
Figure 10:
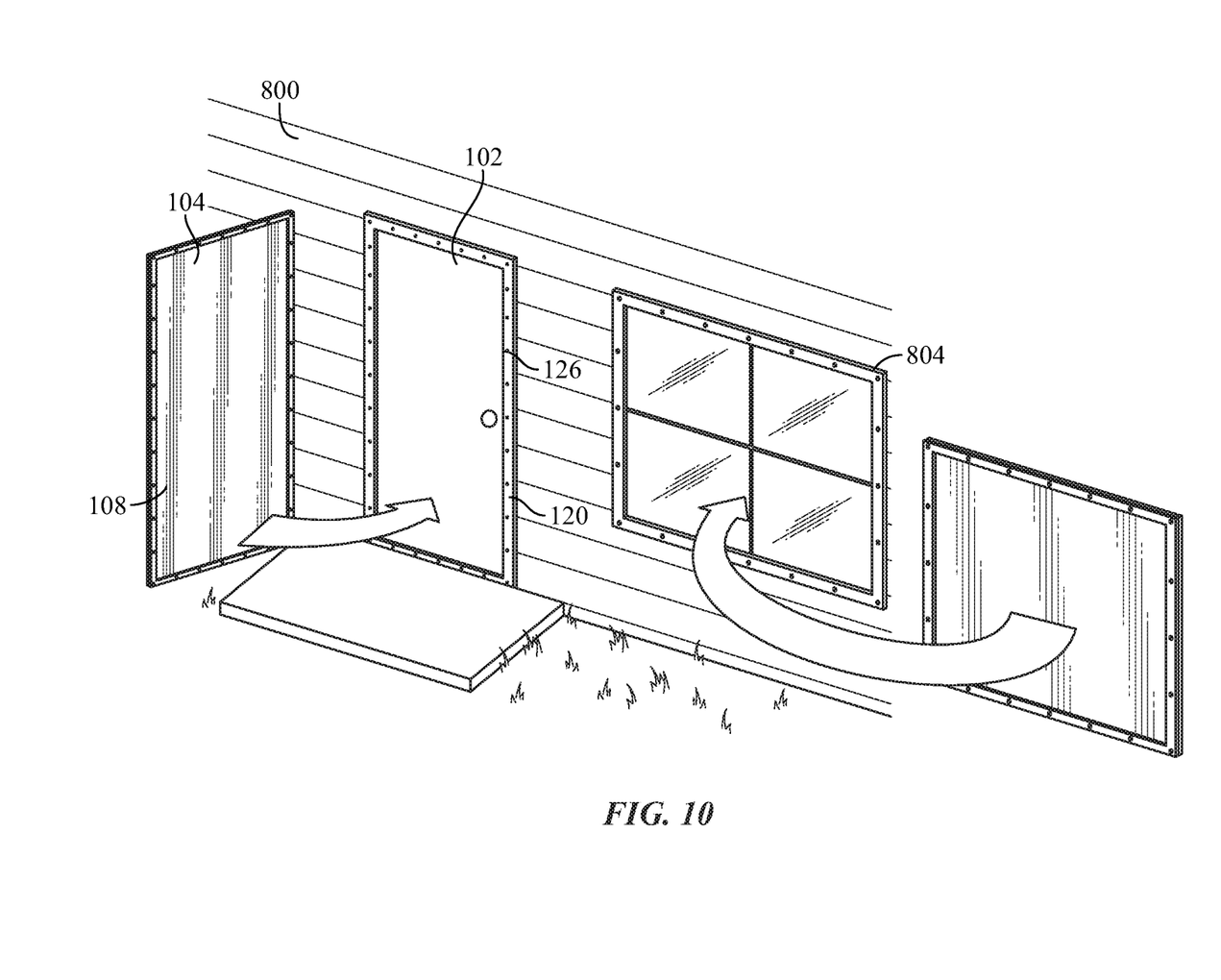
FIG. 10 illustrates a perspective view of the barrier system engaging with a structure, according to an embodiment of the present invention.
Figure 11:
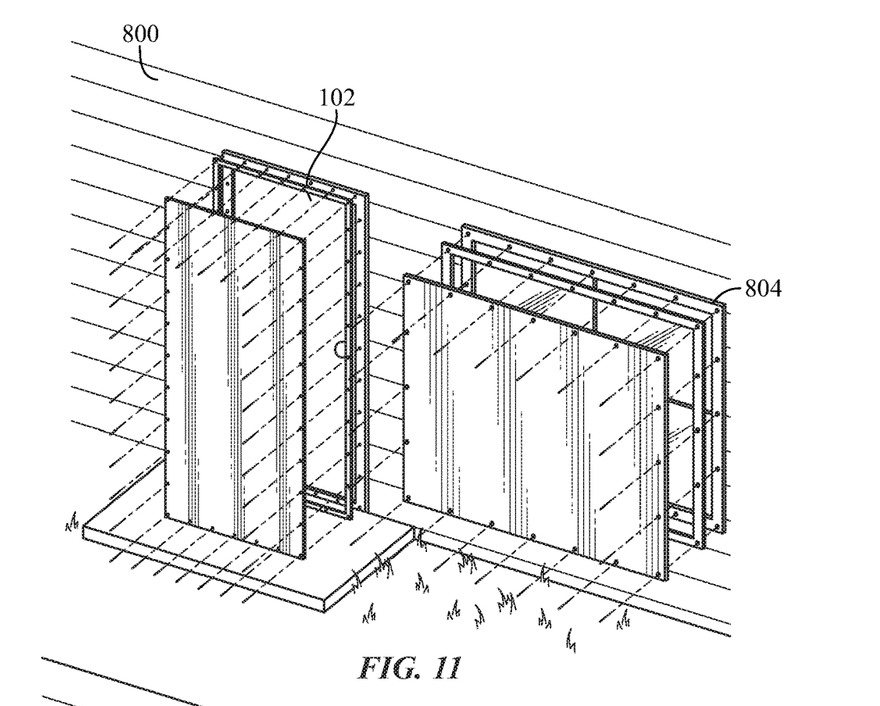
FIG. 11 illustrates an exploded view of the barrier system and a structure, according to an embodiment of the present invention.

FIG. 8 illustrates a structure 800 having the entire entryway embodied as a door and window 804 covered by the barrier system as described above. In embodiments, the system may be provided in a multitude of sizes and shapes to effectively cover entryways as illustrated in FIGS. 10-13. FIG. 9 illustrates the similarities between a door and window system having similar components to engage with the exterior of the entryway. Both the full doorway and window barrier systems may be installed in a similar manner as embodiments described hereinabove, as illustrated in FIG. 10 and FIG. 11. Each may be provided with, or without a brace assembly when affixed to the structure 800.

Figure 12:
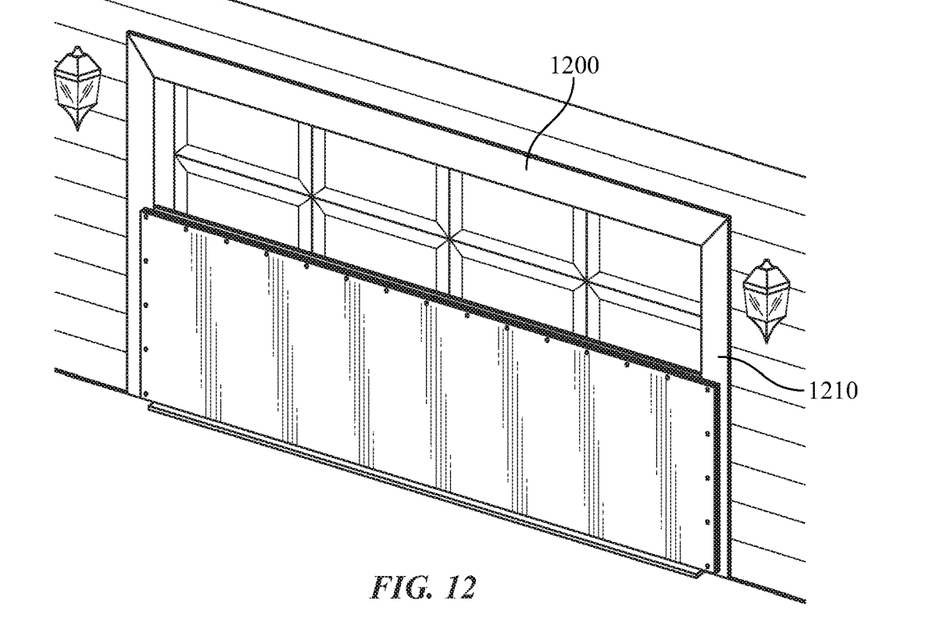
FIG. 12 illustrates a perspective view of the barrier system engaged with a garage door, according to an embodiment of the present invention.
Figure 13:
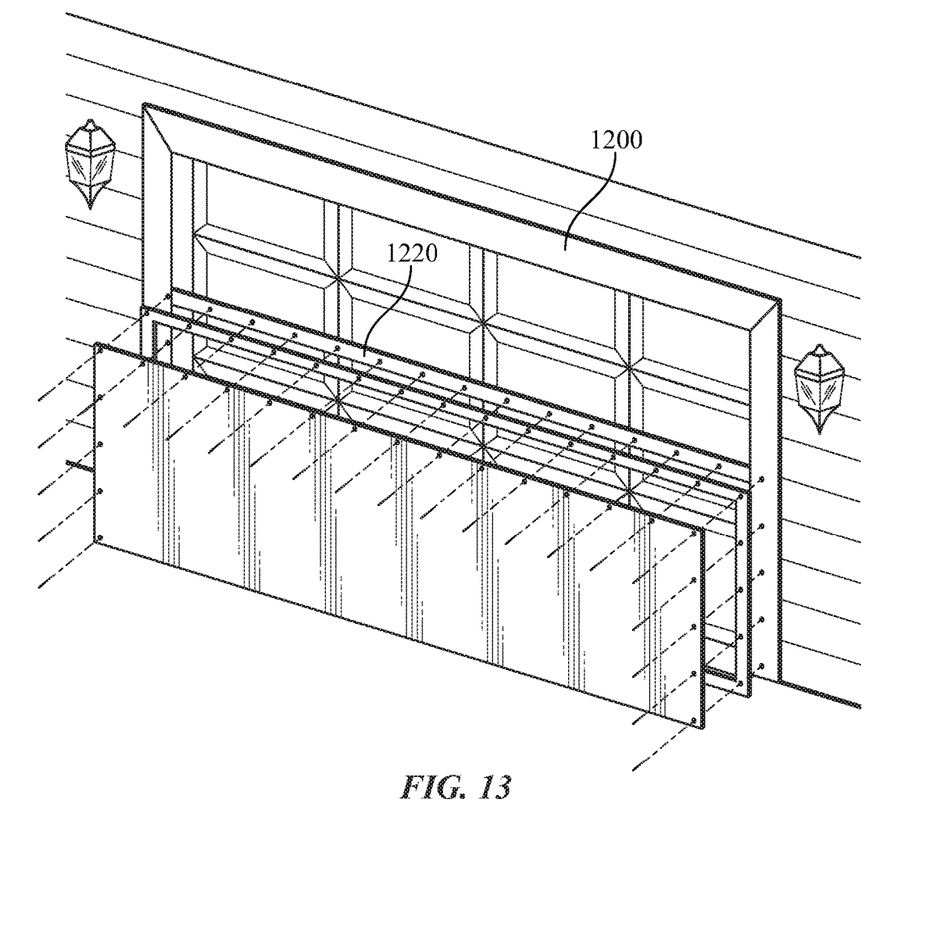
FIG. 13 illustrates an exploded view of the barrier system and a structure, according to an embodiment of the present invention.

In reference to FIGS. 12 and 13, the barrier system is illustrated engaged and engaging with a garage door entryway 1200 or similar large entryway. As described above, one skilled in the art may appreciate that the barrier system may be provided in any shape or size that may effectively engage with an entryway to prevent flood waters from entering a structure. The barrier system affixes to the frame 1210 of the garage door entryway 1200 as well as a horizontal girt 1220 affixed between each side of the frame 1210. The girt 1220 has a plurality of fasteners and receivers to removably engage the barrier system thereto.

In an embodiment, the girt 1220 may function as a fastening means for an upper garage door barrier assembly such that the entire garage door may be covered by the barrier assembly system. Although not specifically shown in FIG. 13, the assembly may be configured in a similar manner as FIG. 7 and/or FIG. 8 above.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A flood barrier assembly comprising:
   a barrier portion having an interior side and an exterior side, the barrier portion dimensioned to sufficiently seal at least a portion of an entryway, the entryway having a frame and a gasket, the barrier portion having, along a top of the barrier portion, a row of holes to receive fasteners to fasten the top of the barrier portion to a girt;
   the girt configured to extend from one side of the entryway to an opposite side of the entryway, the girt configured to receive the fasteners corresponding to the holes to fasten a top of the barrier portion to the girt; and
   a seal affixed to a periphery of the interior side of the barrier portion, the seal and the gasket configured to provide a sealed engagement between the entryway frame and the barrier portion.

2. The assembly of claim 1, wherein the seal and the gasket are dimensioned to provide the sealed engagement there between.

3. The assembly of claim 2, wherein the sealed engagement provides positive suction there between to prevent the leakage of materials.

4. The assembly of claim 1, wherein an additional barrier portion is positionable edge-to-edge to the barrier portion to provide a sealed joint between the barrier portions to enable side-by-side placement of the barrier portions to cover an opening.

5. The assembly of claim 4, wherein a brace assembly is positioned between the barrier portions by a substantially vertical member of the brace assembly being flush with and overlapping the joint.

6. A flood barrier system comprising:
   a barrier portion having an interior side and an exterior side dimensioned to sufficiently seal at least a portion of an entryway, the entryway having a frame and a gasket, the barrier portion having, along a top of the barrier portion, a row of holes to receive a first set of fasteners to fasten the top of the barrier portion to a girt;
   the girt configured to extend from one side of the entryway to an opposite side of the entryway, the girt configured to receive the first set of fasteners corresponding to the holes to fasten a top of the barrier portion to the girt;
   a brace assembly affixed to the exterior side, the brace assembly providing a substantially vertical member configured to abut the barrier portion entirely flush with the exterior side of the barrier portion and providing a substantially horizontal member flush with a substantially horizontal surface and configured to receive a masonry insert inserted through the horizontal member and into the substantially horizontal surface; and
   a seal affixed to a periphery of the interior side of the barrier portion, the seal and the gasket configured to provide a sealed engagement between the entryway frame and the barrier portion.

7. The system of claim 6 wherein the barrier portion has a plurality of apertures each configured to receive a fastener of a second set of fasteners there through, the entryway having a frame and a gasket, the entryway frame having a plurality of receivers each configured to retain one of the fasteners of the second set of fasteners.

8. The system of claim 6, wherein the seal and the gasket are dimensioned to provide the sealed engagement there between.

9. The system of claim 8, wherein the sealed engagement provides positive suction there between to prevent the leakage of materials.

10. The system of claim 6, wherein the brace assembly is removably engaged from the exterior side of the barrier portion.

11. The system of claim 6, wherein the seal and the gasket are dimensioned to provide the sealed engagement there between.

12. The system of claim 11, wherein the sealed engagement provides positive suction there between to prevent the leakage of materials.

13. The system of claim 6, wherein each fastener is a threaded member configured to threadingly engage the corresponding receiver.

14. The system of claim 6, wherein an additional barrier portion is positionable edge-to-edge to the barrier portion to provide a sealed joint between the barrier portions to enable side-by-side placement of the barrier portions to cover an opening.

15. The system of claim 14, wherein one of the brace assembly and an additional brace assembly is positioned between the two barrier portions by a substantially vertical member of one of the brace assemblies being flush with and overlapping the joint.

\* \* \* \* \*